United States Patent Office 3,366,453
Patented Jan. 30, 1968

3,366,453
PRODUCTION OF HYDRIDES OF ALKALINE EARTH METALS AND LITHIUM
Harry Kloepfer, Frankfurt am Main, Helmut Knorre, Hainstadt (Main), and Karl Stephan, Frankfurt am Main-Hausen, Germany, assignors to Deutsche Gold- und Silber-Scheideanstalt vormals Roessler, Frankfurt am Main, Germany
No Drawing. Filed Sept. 14, 1961, Ser. No. 137,984
Claims priority, application Germany, Sept. 23, 1960, D 34,335
5 Claims. (Cl. 23—204)

The present invention relates to an improved process for the production of alkaline earth metal and lithium hydrides by reacting halides of the corresponding metals with sodium or potassium or alloys thereof in the presence of hydrogen.

It is known that the hydrides of alkali metals and alkaline earth metals can be produced from the metals in elemental form. Processes are also known which avoid the often costly production of pure alkali and alkaline earth metals by using compounds of these metals as starting materials. An example of such processes is the production of calcium hydride by reacting calcium oxide with magnesium in a hydrogen atmosphere. A disadvantage of such process is that both the calcium oxide serving as starting material and the magnesium oxide formed are always present in solid form which render irregularities and formation of inclusions unavoidable.

It is also known that the hydrides of alkali and alkaline earth metals can be produced by conversion of the corresponding carbides, cyanides, cyanamides, phosphides, silicides, borides, alcoholates or phenolates with hydrogen at raised temperatures and pressures. These processes are, however, difficult to carry out on a commercial scale and are rather costly.

Also, German Patent 1,031,526 discloses a process for the production of alkaline earth metal hydrides starting from the corresponding halides in which such halides are reacted with sodium in the presence of hydrogen at raised temperatures. In such process the starting materials are supplied in finely ground state and care is taken that the reaction temperature remains below the melting point of the mixture. According to the indications in such patent the conversions obtained are incomplete if they are carried out at temperatures above the melting point of the mixture. The requirement that the reaction must be carried out in the solid phase provides great difficulties, particularly if it is to be carried out on a large scale.

According to the invention it was found unexpectedly that the reaction between water free halides of the alkaline earth metals and lithium and an alkali metal in the presence of hydrogen at elevated temperatures can be carried out smoothly and with practically quantitative yields, if such reaction is carried out in the fused state while layer formation is prevented as much as possible. Sodium or potassium or their alloys can be employed as the reducing agent. The products produced according to the invention are free of sodium or, respectively, potassium hydride.

In order that practically 100% yields are obtained in every instance, it is necessary that the process according to the invention be carired out under certain temperature conditions, namely, not above the boiling point of the alkali metal or its alloy employed as reducing agent nor above the temperature at which the hydride to be formed dissociates noticeably and not below the melting point of the salt mixture present. As the reaction is exothermic, it may be necessary to take care that the indicated maximum temperatures are not exceeded. In the case of the production of calcium hydride, for example, a temperature of about 725° C. should not be exceeded and in the production of lithium hydride a temperature of about 650° C. should not be exceeded. If a stoichiometrically composed reaction mixture possesses a melting point above the upper limit indicated above, it is expedient to add salts thereto which lower the melting point of the mixture. For example, in the production of calcium hydride from calcium chloride the melting point can be lowered by providing an excess of calcium chloride. The use of an excess of the starting halide for purposes of lowering the melting point is preferred. It is, of course, possible to employ other halides of the same metal as the starting halide or of an alkali metal for the same purpose.

The molten reaction mixture easily stratifies in view of the different densities of the components supplied as well as those formed. This can hinder or even prevent access of the hydrogen to the alkaline earth metal or lithium. It is therefore necessary that such stratification or formation of layers be prevented as completely as possible or entirely. This can be accomplished with effective stirring.

Stirring in the vertical direction has proved particularly expedient as this type of stirring most effectively counteracts stratification. Such stratification can, however, be hindered by other mixing or stirring methods, such as, for example, by passing hydrogen or other gases which are inert through the melt or by vibrations. Stirring is especially important in the production of lithium hydride as this is of especially low specific gravity and therefore can especially easily separate off as an upper layer having an isolating action.

In carrying out the process according to the invention it is not necessary that the melt be homogeneous in its entirety even though this would be the ideal condition for the reaction. The melt may contain solid constituents. The process can be carired out with good success when the reaction mixture is at least in the form of a stirrable fluid melt. This condition can be provided right from the start, that is, in the starting mixture, by suitable choice of temperature. However, it is more advantageous to select a temperature range for carrying out the process according to the invention at which at least the starting mixture is completely in the molten condition and that a melt containing solid particles suspended therein is only obtained as the reaction proceeds.

All halides of the alkaline earth metals and lithium can be employed as the source of the alkaline earth metal or lithium for the hydrides to be produced and sodium and/or potassium or their alloys can be used as the reducing agents. Preferably, however, chlorides and metallic sodium are employed as the starting materials.

These starting components can be supplied to the reaction in stoichiometric quantities. Expediently, however, in the production of alkaline earth metal hydrides, the starting halides are employed in excess quantities. In the production of lithium hydride the use of excess lithium halide provides no advantage. Even though no excess halide is employed, the hydride always is obtained in practically quantitative yields.

In carrying out the process according to the invention the starting materials are expediently placed in a closed reaction space, it not being necessary that they previously have been converted to a finely divided state. The mixture is then heated in an atmosphere of hydrogen and as soon as a stirrable melt is obtained the stirring or other measure avoiding stratification is begun. Hydrogen is supplied in the quantity it is consumed. For this purpose maintenance of a pressure 50–70 mm. Hg above atmospheric generally suffices. As the reaction is exothermic it is not necessary to supply heat from an external source during all of the reaction. The reaction is complete when no further hydrogen consumption can be ascertained. The reaction mixture is then permitted to cool in a hydrogen or an inert gas atmosphere. The hydrides which are produced practically quantitatively are obtained as mixtures with the halide of the alkali metal employed and any halide which may have been employed in excess. The mixtures can be employed as such for the production of hydrogen by the addition of water. If desired, the hydrides produced can be separated out by known procedures, such as, for example, treatment of the mixtures with a solvent for the alkali metal halide but inert with respect to the hydride. Examples of such solvents are glycerine, propylene glycol, liquid ammonia and the like.

The following examples will serve to illustrate several embodiments of the invention.

Example 1

666 g. of technical calcium chloride (6 mol) which in addition contained 43 g. of sodium chloride as impurity and 230 g. of metallic sodium (10 mol) were placed in an iron crucible provided with a cover and heated under hydrogen. As soon as a stirrable melt is present the mixture is heated with vertical stirring to 715° C. and maintained at this temperature while stirring until take up of hydrogen ceased. After cooling, the solidified melt was removed from the vessel. The solidified product amounted to 945 g. corresponding to 99.6% and contained 22.0% of calcium hydride corresponding to a 99.5% conversion.

Example 2

The procedure of Example 1 was repeated except that a 30% excess of calcium chloride, namely, 721 g. which in addition contained 40 g. of sodium chloride as impurity were employed. The reaction temperature was 680° C. 1000 g. of solidified product were obtained containing 21% of calcium hydride corresponding to a 100% conversion.

Example 3

433 g. of lithium chloride (10.2 mol corresponding to an excess of 2%) and 230 g. of sodium were reacted under hydrogen as described in Example 1 at 615° C. 650 g. of the solidified product were recovered corresponding to 96.5%. The lithium hydride content thereof was 11.54% corresponding to a 97.5% conversion.

We claim:

1. In a process for the production of a hydride selected from the group consisting of calcium hydride and lithium hydride by reacting a water free halide of a metal corresponding to that of the hydride to be produced with an alkali metal selected from the group consisting of sodium and potassium in contact with hydrogen, the steps which comprise providing a reaction mixture of the alkali metal and a halide salt component essentially consisting of a material selected from the group consisting of halides of the metal corresponding to the hydride to be produced and mixtures of at least one of such halides with at least one alkali metal hydride selected from the group consisting of sodium and potassium halides, said salt component having a melting point below the temperature at which the hydride to be prepared dissociates appreciably, heating such reaction mixture in contact with hydrogen to a temperature at which the reaction mixture forms at least a stirrable melt but below a temperature at which the hydride prepared dissociates appreciably and below the boiling point of the alkali metal employed, the composition of such halide salt component being such that at least a stirrable melt is formed at said temperature, maintaining such temperature during the course of the reaction and agitating the melt to prevent any substantial stratification of the melt during the reaction.

2. The process of claim 1 in which said reaction is carried out at a temperature at which the starting mixture is completely molten and at which the reaction mixture produced is at least a stirrable fluid melt.

3. The process of claim 1 in which the melt is stirred in the vertical direction during the reaction to prevent stratification.

4. The process of claim 1 in which said halide is calcium chloride and said alkali metal is sodium.

5. The process of claim 1 in which said halide is lithium chloride and said alkali metal is sodium.

References Cited

UNITED STATES PATENTS

| | | | |
|---|---|---|---|
| 2,794,733 | 6/1957 | Alexander et al. | 23—204 X |
| 2,864,671 | 12/1958 | Mohlman | 23—204 X |
| 3,130,011 | 4/1964 | Evans et al. | 23—205 |
| 1,796,265 | 3/1931 | Freudenberg et al. | 23—204 |
| 2,408,748 | 10/1946 | Alexander | 23—204 |
| 2,702,740 | 2/1955 | Wade et al. | 23—204 |
| 2,794,732 | 6/1957 | Alexander | 23—204 |

MILTON WEISSMAN, *Primary Examiner.*

MAURICE BRINDISI, *Examiner.*

M. N. MELLER, *Assistant Examiner.*